No. 691,225.

F. G. WILSON.
MACHINE FOR GRINDING LENSES.
(Application filed Feb. 9, 1901.)

(No Model.)

Patented Jan. 14, 1902.

3 Sheets—Sheet 1.

WITNESSES:
F. E. Arthur
H. E. Chase

INVENTOR
Frank G. Wilson,
BY
Smith & Denison
ATTORNEYS.

No. 691,225. Patented Jan. 14, 1902.
F. G. WILSON.
MACHINE FOR GRINDING LENSES.
(Application filed Feb. 9, 1901.)
(No Model.) 3 Sheets—Sheet 2.

WITNESSES:

INVENTOR
Frank G. Wilson,
BY
Smith & Denison
ATTORNEYS.

No. 691,225. Patented Jan. 14, 1902.
F. G. WILSON.
MACHINE FOR GRINDING LENSES.
(Application filed Feb. 9, 1901.)
(No Model.) 3 Sheets—Sheet 3.
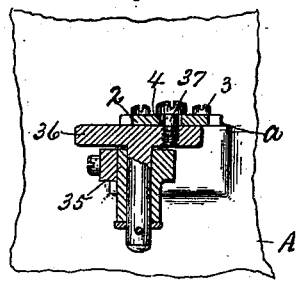
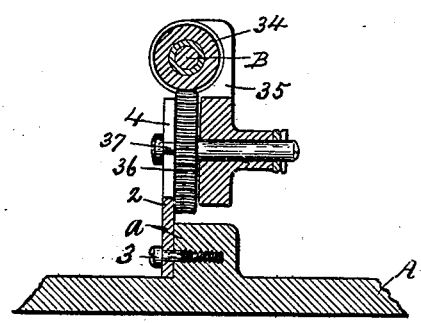
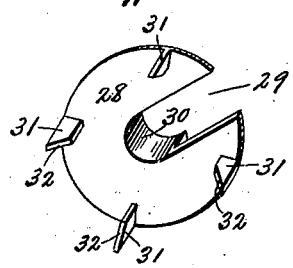
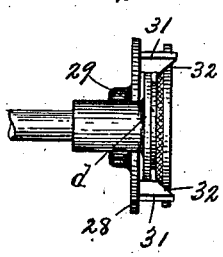
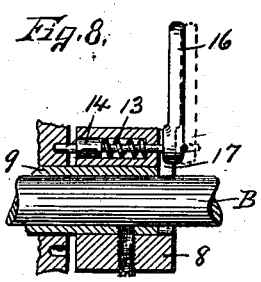
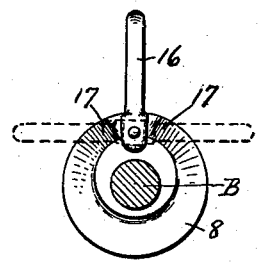
WITNESSES:
INVENTOR
Frank G. Wilson,
BY
Smith & Davison
ATTORNEYS.

UNITED STATES PATENT OFFICE.

FRANK G. WILSON, OF ITHACA, NEW YORK.

MACHINE FOR GRINDING LENSES.

SPECIFICATION forming part of Letters Patent No. 691,225, dated January 14, 1902.

Application filed February 9, 1901. Serial No. 46,657. (No model.)

*To all whom it may concern:*

Be it known that I, FRANK G. WILSON, of Ithaca, in the county of Tompkins, in the State of New York, have invented new and useful Improvements in Machines for Grinding Lenses, of which the following, taken in connection with the accompanying drawings, is a full, clear, and exact description.

This invention relates to improvements in machines for grinding lenses, the object being to produce a simple and compact device whereby the lenses may be automatically, neatly, and uniformly ground to any desired standard, form, or size.

The further object of this invention is to provide means whereby the lens-supporting carriage may be reciprocated along the surface of a suitable grindstone for maintaining a uniform grinding-surface upon said stone or other grinding device.

A still further object of my invention is to provide a simple and practical means for operating the revoluble parts of my invention or impeding the movement of said revoluble parts when desired; and a further object of my invention is to provide a suitable device for varying the size of the lens during the process of grinding the same.

To this end the invention consists in the construction, combination, and arrangements of the component parts of a lens-grinding machine, as hereinafter fully described, and pointed out in the claims.

Figure 1:
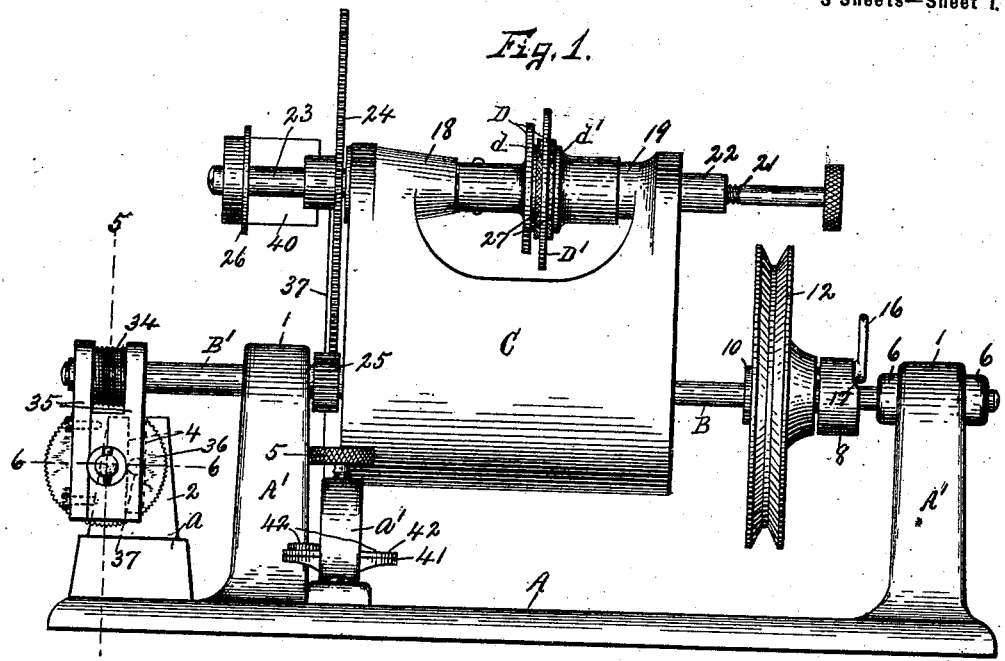
Figure 2:
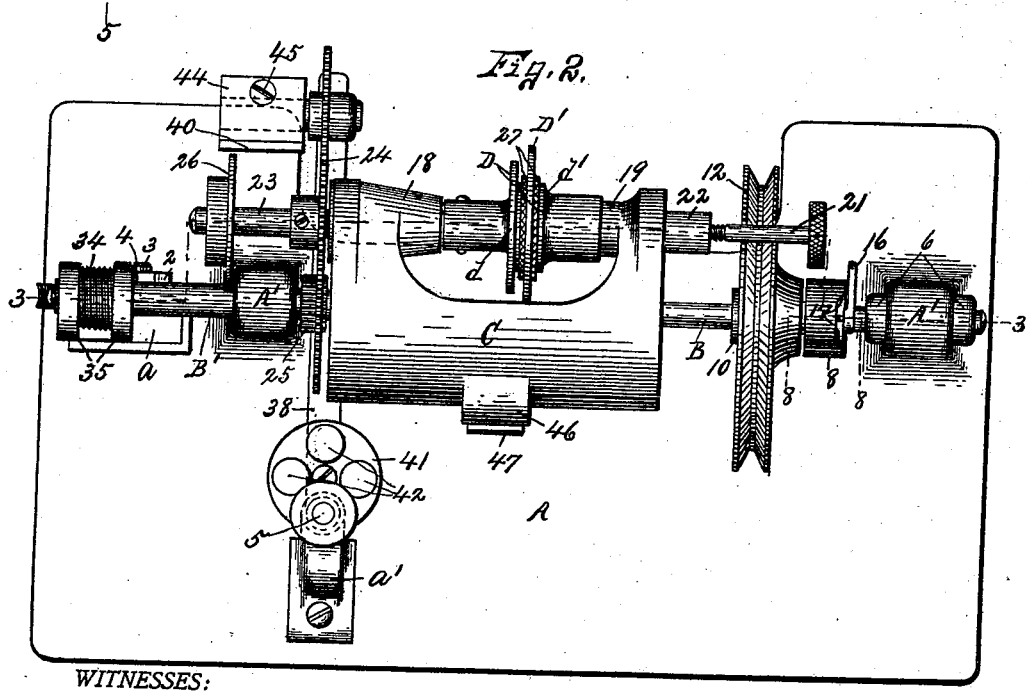
Figure 3:
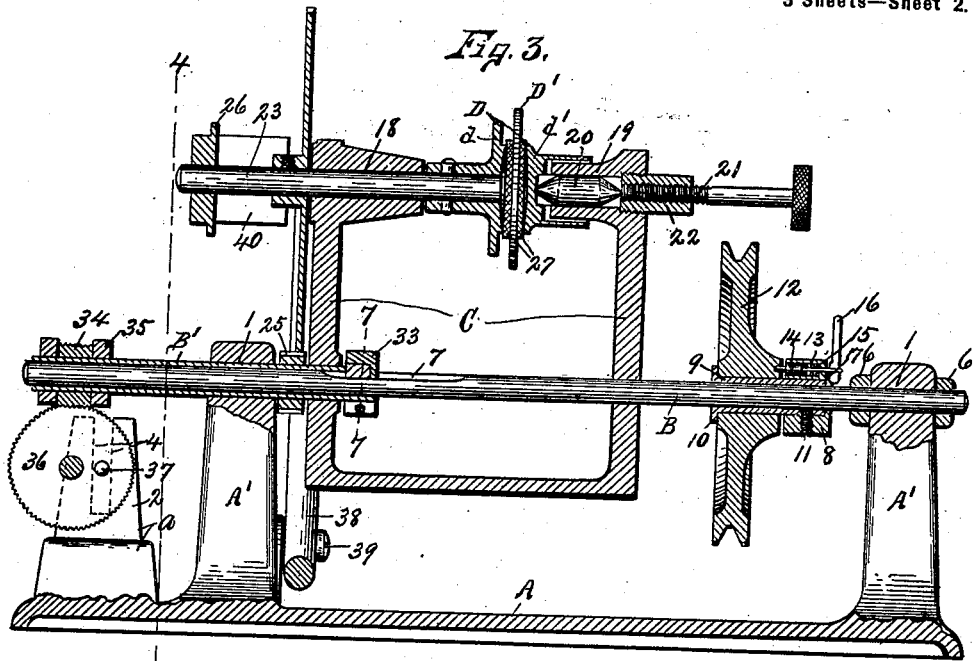
Figure 4:
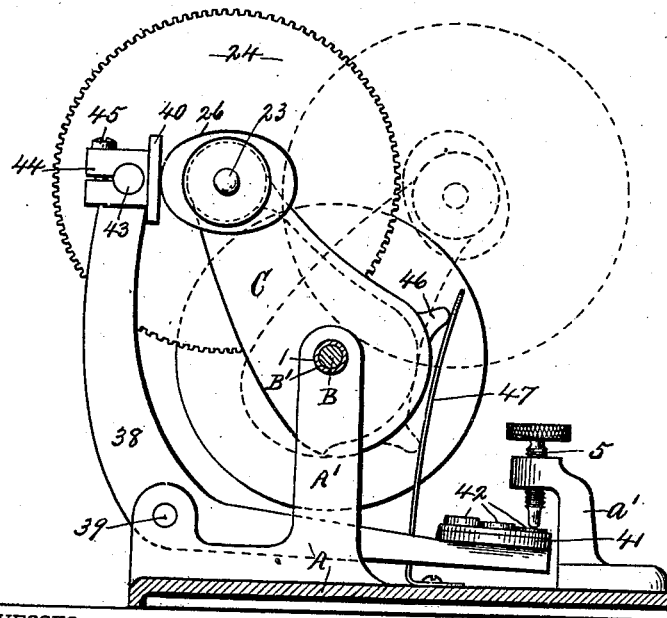

Referring to the drawings, Figures 1 and 2 are respectively a front elevation and a top plan of my invention. Fig. 3 is a longitudinal vertical section taken on line 3 3, Fig. 2. Fig. 4 is an end sectional view taken on line 4 4, Fig. 2. Figs. 5, 6, 7, and 8 are sectional views taken, respectively, on lines 5 5 and 6 6, Fig. 1, and 7 7, Fig. 3, and 8 8, Fig. 2. Fig. 9 is an end view of the parts seen in Fig. 8. Fig. 10 is a detail elevation of one of the clamping-jaws and the lens-centering device mounted thereon. Fig. 11 is an isometric view of the detached lens-centering device.

Similar reference characters indicate corresponding parts.

This invention consists, essentially, of a supporting-frame A, a revoluble shaft B, a lens-carriage C, a revoluble lens-clamping head D, means for reciprocating the carriage C lengthwise of the shaft B, and additional means for regulating the size of the lens during the process of grinding.

The frame A may be of any desired form, size, or construction and preferably consists of a base-plate having separated upright standards A' and upright brackets $a\ a'$. The standards A' are provided with suitable bearings 1 for receiving the revoluble shaft B, and the bracket $a$ generally consists of a boss formed upon the base of the frame A, and a plate 2, secured to said boss by a suitable screw or other fastening means 3 and provided with an upright slot 4, extending downwardly from its upper end face, said slotted plate forming a portion of the means for reciprocating the lens-carriage along the revoluble shaft B. The bracket $a'$ is secured to the base-plate of the frame A, preferably between the upright standards A' and in proximity to one end of the carriage C, and is generally provided with a threaded aperture at its upper end for receiving a suitable adjusting-screw 5, which forms a part of the device for sizing the lenses.

The revoluble shaft B is revolubly mounted in the bearings 1, one end of said shaft being provided with collars 6, adapted to engage the opposite faces of one of the standards A', and the other end of said shaft extends beyond the other standard and is provided with a keyway 7 and a clutch member or collar 8, which is preferably secured to said shaft at one end of the carriage C. This shaft is also provided with a wearing-sleeve 9, having its inner end provided with annular shoulders 10, the clutch member 8 being secured to the outer end of said sleeve and shaft by a suitable set-screw 11. Interposed between the clutch member 8 and the shoulder 10 is a pulley 12, journaled on the intermediate portion of the sleeve 9 and provided with one or more apertures extending inwardly from its outer end face. The clutch member 8, as previously stated, is secured to the outer end of the sleeve 9 and is provided with a socket 13, in which is movable a plunger 14, having its inner end adapted to enter the recesses or apertures in the end face of the pulley 12 for locking said pulley to the clutch member 8. Any desired means may be employed for moving this plunger into and out of the sockets or apertures of the pulley 12, this means usually consisting of a spring 15, interposed between the plunger and the end wall of the socket 13 for forcing the plunger into the apertures of the pulley 12, and a handpiece 16, mounted on the outwardly-projecting end of the stem of the plunger 14 and adapted to engage suitable cam-faces 17, projecting from the adjacent end face of the collar or clutch member 8. The pulley 12 may be connected to any desired source of power, but is usually connected to mechanism (not illustrated) for rotating the grinding-wheel seen in dotted lines in Fig. 4, a portion of which is shown by full lines in Fig. 1. This pulley 12 is loosely mounted upon the sleeve 9 and is provided with a grooved periphery for receiving a suitable belt connected, as previously mentioned, for rotating said pulley continuously in one direction.

When desired to rotate the shaft B, the handpiece 16 is moved to the position seen in Figs. 1, 3, 8, and 9, and when it is desired to prevent the rotation of the shaft B the member 16 is moved laterally into engagement with one of the cam-faces 17, whereupon the inner end of the plunger is withdrawn from the aperture in the pulley 12, and said pulley is free to rotate independently of the shaft. The carriage C may also be of any desired form or size, is adapted to rock toward and away from the grinding-wheel previously mentioned, and preferably consists of a rocking frame pivotally mounted upon the shaft B and provided at its upper end with separated bearings 18 and 19 for receiving and supporting the revoluble clamping-head D, previously mentioned.

The bearing 19 generally consists of a hollow hub having an external or peripheral bearing-face for receiving one of the clamping jaws or plates and an inner bearing for receiving a spindle 20, which is provided with tapering or conical ends, one of which ends is arranged to engage one of the clamping-plates, and the other end is adapted to be engaged by an adjusting-screw 21, movable in a threaded bushing 22, for forcing the adjacent clamping-plate toward the other clamping-plate.

The clamping member D consists of oppositely-arranged jaws or plates $d$ $d'$, one of which, $d'$, is journaled on the periphery of the bearing 19, and the other clamping-plate $d$ is mounted on a spindle or shaft 23, which is journaled on the bearing 18, extends beyond said bearing, and is provided with a gear 24, meshing with a pinion 25, presently described. The shaft 23 is also provided with a suitable lens-form 26, which is detachably secured to said shaft and is adapted to engage a suitable contact-plate of the sizing device previously mentioned. These lens-forms are usually of different standard shapes and serve to determine the shape of the lens, as D', during the process of grinding. In order that the lens D' may be securely held in position without liability of fracturing or injuring the glass, I usually interpose suitable flexible pads 27 between the opposite faces of the lenses and the adjacent faces of the plates $d$ $d'$. The means for centering the lenses when being inserted between the plates $d$ $d'$ consists of a plate 28, having a slot 29, extending inwardly from one of its peripheral edges, the inner end wall 30 of said slot being semicircular in form and serving as a suitable stop for engaging the peripheral face of one of the clamping-plates, as the hub of the plate $d$, for limiting the transverse movement of said centering-plate. This centering-plate is provided with a series of laterally-projecting shoulders 31, having inclined faces 32, inclining inwardly toward the center from their outer peripheral faces and arranged substantially concentric with the bearing-face 30, so that when the slot of the centering-plate is alined with the hub of the clamping-plate $d$ and moved transversely to the limit of its movement the inclined faces 32 will be substantially concentric with the axis of movement of clamping-heads. It is apparent from the foregoing description that when this centering-plate is placed in operative position and the lens centered therewith the lens-centering plate may be readily alined with the lens-form 26, and, if desired, one or the other of the clamping-plates may be provided with a flattened portion or guide for receiving the centering-plate 28, so that the lens and the centering-plate may be readily and mechanically alined with the lens-form.

The means for reciprocating the lens-carriage C along the shaft B preferably consists of a sleeve B', feathered on the shaft B and having its inner end provided with a collar 33 and its outer end provided with a worm 34 and a yoke 35, which is arranged to support a suitable worm-gear 36, meshing with the worm 34, said worm-gear being provided with an eccentric shoulder 37, movable in the slot 4 of the bracket or plate 2. The pinion 25, previously mentioned, is also mounted upon the sleeve B', said pinion 25 and the collar 33 being arranged on opposite sides of one of the upright walls of the carriage C for effecting the reciprocal movement of the said carriage as the gear 36 is rotated.

It is evident from the foregoing description that the revoluble shaft B rotates the sleeve B' and the worm 34, and thereby rotates the worm 36, and that the pin 37, being arranged at one side of the axis of the gear 36, engages the walls of the slot 4, and thereby moves the sleeve and carriage back and forth along the shaft B. This is a particularly simple and effective means of reciprocating the carriage and causes as little vibration or jar to the machine as possible, being adapted to effect a steady and uniform reciprocal movement of said carriage even at the limits of its movement.

The means for sizing the lenses during the process of grinding, as seen in the drawings, consists of a rock-lever 38, pivotally connected at 39 to the frame A and having its upper end provided with a contact-plate 40, arranged to be engaged by the periphery of the lens-form 26, and its other end provided with a rotary sizer-plate 41, having a series of surfaces 42, projecting unequal distances from said plate and adapted to be engaged by the adjusting-screw 5 of the bracket $a'$. These surfaces are so arranged that by rotating the plate 41 one or the other of said surfaces may be brought into alinement with the screw 5, thereby varying the position of the contact-surface of the plate 40 with relation to the axis of movement of the lens-form 26. These surfaces are usually numbered or designated by characters corresponding with the numbers of characters distinguishing the various sizes of lenses one from the other, and when desired to grind a lens to a predetermined or certain standard size the adjusting-screw may be rotated against the plate 41 for rocking the arm or lever 38 and forcing the contact-plate 40 toward or away from the axis of the lens-form, or, what is preferable, one of the surfaces 42 of the plate 41, corresponding to the desired size of lens, is rotated into alinement with the adjusting-screw 5. The contact-plate 40 is usually mounted on a pivotal pin 43 and is provided with a split hub 44 and a clamping-screw 45 for permitting said contact-plate to be adjusted at any angle to conform with the different positions of the lever 38 for causing a substantially radial contact between the lens and the surface of the grinding-wheel.

The carriage C is adapted to rock the lens-form into and out of contact with the plate 40 on opposite sides of a line drawn vertically through the axis of its movement, whereby the said carriage is normally held by its own gravity either in its operative or inoperative position. In order to further insure the holding of said carriage in either of said positions, I provide the same with a shoulder 46, which is adapted to rock with said carriage on opposite sides of a line drawn horizontally through the axis of the carriage and adapted to engage a spring 47, having its lower end secured to the base of the frame A, it being understood that as the carriage is rocked into and out of its operative positions said spring will engage the opposite upper and lower faces of said shoulder and additionally hold the carriage from undue rocking movement.

The collar 33 of the sleeve 32 is preferably split and is provided with a suitable key movable in the keyway 7 of the shaft B and with a clamping-screw for firmly securing the collar to the inner end of the sleeve 32.

The operation of my invention is as follows: When desired to rotate the lens-clamping head, the clutch member 16 is moved to the desired position for locking the pulley 12 to the shaft B, whereupon said shaft is rotated and transmits motion through the gears 24 and 25 to the shaft or spindle 23, thereby rotating the lens which is clamped between the plates $d\ d'$, the plate $d'$ being simultaneously rotated upon the points of the spindle 20. The carriage is then moved carefully toward the grindstone or other grinding device and the lens is rotated against the surface of said grinding-wheel and is simultaneously reciprocated lengthwise of the shaft B by the wheel 36 and pin 37 coacting with the slotted bracket $a$. The grinding of the lens continues as long as the lens is of greater size than that desired, and as soon as any portion of the lens has been ground to the size required said lens-form will contact with the plate 40 and prevent further grinding at that particular place. Therefore it is apparent that the lens will be ground to the same form as the form 26 and that various sizes of lenses may be ground by changing the position of the contact-plate through the means of the revoluble sizer-plate 41 and adjusting-screw 5.

The operation of my invention will now be readily understood upon reference to the foregoing description and the accompanying drawings, and it will be noted that considerable change may be made in the detail construction and arrangement of the parts of my invention without departing from the spirit thereof. Therefore I do not limit myself to the precise construction as is shown and described, and it will be noted that the surface of the plate 40 is turned to the same radius as that of the grinding-wheel, so that when the lens is resting against the grinding-wheel their respective radii are substantially coincident.

Having thus described my invention, what I claim, and desire to secure by Letters Patent, is—

1. In a lens-grinding machine, a former and sizer having a movable sizer-plate provided with a series of surfaces fixed to the plate and projecting unequal distances therefrom.

2. In a lens-grinding machine, a former and sizer having a revoluble sizer-plate provided with a series of surfaces of unequal projection for the purpose described.

3. In a lens-grinding machine, the combination with a revoluble lens-support having a lens-form, a contact-plate, and an adjusting-screw for varying the position of the contact-plate relative to the axis of the former, said contact-plate having an independent movement for changing the point of contact with the periphery of the lens-form.

4. A lens-grinding machine comprising a revoluble lens-support having a lens-form, a contact-plate, and a revoluble sizer-plate having a series of surfaces of unequal projection for varying the position of the contact-plate with relation to the lens-form.

5. In a lens-grinding machine, the combination with a revoluble lens-support having a lens-form, of a rock-arm provided with a contact-face, means for varying the point of contact of said face with the lens-form, and an adjusting-screw for moving said arm for the purpose described.

6. A lens-grinding machine comprising a revoluble lens-support, a lens-form, a rock-arm having a contact-surface for engaging the lens-form, and means for rocking said arm for moving the contact-surface step by step toward or away from the axis of the lens-form.

7. A lens-grinding machine comprising a revoluble lens-support, a lens-form, a rock-arm having a contact-surface for engaging the lens-form, and a movable sizer-plate having unequally-projecting surfaces operating in conjunction with a shoulder for rocking said arm for the purpose described.

8. The combination with a rotary lens-support in a lens-grinding machine, of a lens-form revoluble with the support, a rock-arm provided with contact-surface and sizer-surfaces of unequal projection, and a stop-shoulder for engaging the sizer-surfaces for the purpose specified.

9. A lens-grinding machine comprising a revoluble lens-support having a lens-form, a contact-plate, a sizer-plate connected to the contact-plate and provided with a series of unequal projections, and a stop for engaging said projections.

10. A lens-grinding machine comprising a revoluble lens-support having a lens-form, a contact-plate, a sizer-plate connected to the contact-plate and provided with a series of unequal projections, and an adjustable stop for engaging said projections.

11. A lens-grinding machine comprising a revoluble lens-support having a lens-form, a rocking lever having one end provided with an adjustable contact-surface for engaging the lens-form at different points on its periphery, and an adjustable stop for engaging the opposite end of the lever for moving the contact-surface toward and away from the axis of the lens-form.

12. A lens-grinding machine comprising a revoluble lens-support having a lens-form, a rocking lever having one end provided with a contact-surface for engaging the lens-form, a movable sizer-plate mounted on the other end of the lever and provided with a series of surfaces of unequal projection, and a stop for engaging said surfaces.

13. A lens-grinding machine comprising a revoluble lens-support having a lens-form, a rocking lever having one end provided with a pivoted contact-plate for engaging the periphery of the lens-former at different points, and an adjusting-screw for controlling the position of the rock-lever.

14. A lens-grinding machine comprising a revoluble lens-support having a lens-form, a rocking lever having one end provided with an adjustable contact-plate for the lens-former, a revoluble sizer-plate mounted on the opposite end of the lever and provided with a series of surfaces of unequal projection, and an adjusting-screw for engaging said surfaces for the purpose described.

15. A lens-clamp for lens-grinding machines comprising a supporting-frame having a revolving face-plate, a second plate revolubly mounted on the frame, an adjusting-screw, and a conical-ended spindle interposed between the second plate and the screw for the purpose described.

16. A lens-clamp for lens-grinding machines comprising a supporting-frame having separated bearings, a revolving shaft journaled in one of the bearings and provided with a face-plate, a second plate journaled in the frame and movable toward and away from the former plate, an adjusting-screw, and a spindle mounted in the other bearing and provided with tapering ends engaged respectively with the adjacent faces of said second plate and screw for the purpose described.

17. A lens-grinding machine comprising a rocking support having a revoluble lens-clamp, and a projecting shoulder movable in planes above and beneath its axis of movement, and a spring for engaging opposite faces of said shoulder for the purpose specified.

18. In a lens-grinding machine, the combination with a frame, a revoluble shaft, a sleeve feathered on the shaft and movable lengthwise thereof, a carriage actuated by the sleeve and provided with a rotary lens-clamp actuated by the shaft, a fixed engaging member, and means carried by the sleeve and coacting with the fixed member for reciprocating the sleeve and carriage.

19. In a lens-grinding machine, the herein-described means of reciprocating the lens-carriage comprising a fixed member having an elongated slot, a revoluble shaft, a sleeve feathered on the shaft and connected to the carriage, gears mounted on the sleeve and rotated thereby, one of said gears being provided with a shoulder and engaged with the walls of the slot for the purpose set forth.

20. In a lens-grinding machine, the herein-described means for reciprocating the lens-carriage comprising a fixed member having an elongated slot, a revoluble shaft, a sleeve feathered on the shaft and connected to the carriage, a worm secured to the sleeve, a yoke mounted on the sleeve, a gear mounted on the yoke and meshing with said worm, said gear being provided with an eccentric shoulder movable in said slot for the purpose set forth.

21. The combination with a rotary lens clamp and form of a lens-grinding machine, of a centering device for the lens consisting of a plate having a stop-face and lateral inclined faces concentric with the axis of the stop-face for the purpose described.

22. The combination with a rotary lens clamp and form of a lens-grinding machine, of a centering device for the lens consisting of a plate having an open-ended slot for receiving one of the revoluble members adjacent to the lens-clamp, said plate being formed with a series of inclined faces concentric with the axis of the plate for receiving and centering the lens when being inserted between the clamping members.

23. A lens-grinding machine, comprising a supporting-frame, a revoluble shaft provided with a loose pulley and a clutch for locking the pulley to the shaft, a carriage supported by the shaft and having reciprocal and oscillatory movements, a sleeve feathered on the shaft and connected to the carriage, a pinion and worm secured to the sleeve, a lens-clamp journaled on the carriage and provided with a lens-form, a contact-plate mounted on the frame for engaging the lens-form, a revoluble sizer-plate having surfaces of unequal projection coacting with a stop for controlling the position of the contact-plate relative to the lens-form, and a worm-gear meshing with the worm and provided with an eccentric shoulder operating in conjunction with a slotted bracket for effecting the reciprocal movement of the carriage.

In witness whereof I have hereunto set my hand this 10th day of December, 1900.

FRANK G. WILSON.

Witnesses:
 H. E. CHASE,
 MILDRED M. NOTT.